United States Patent Office 3,407,388
Patented Oct. 22, 1968

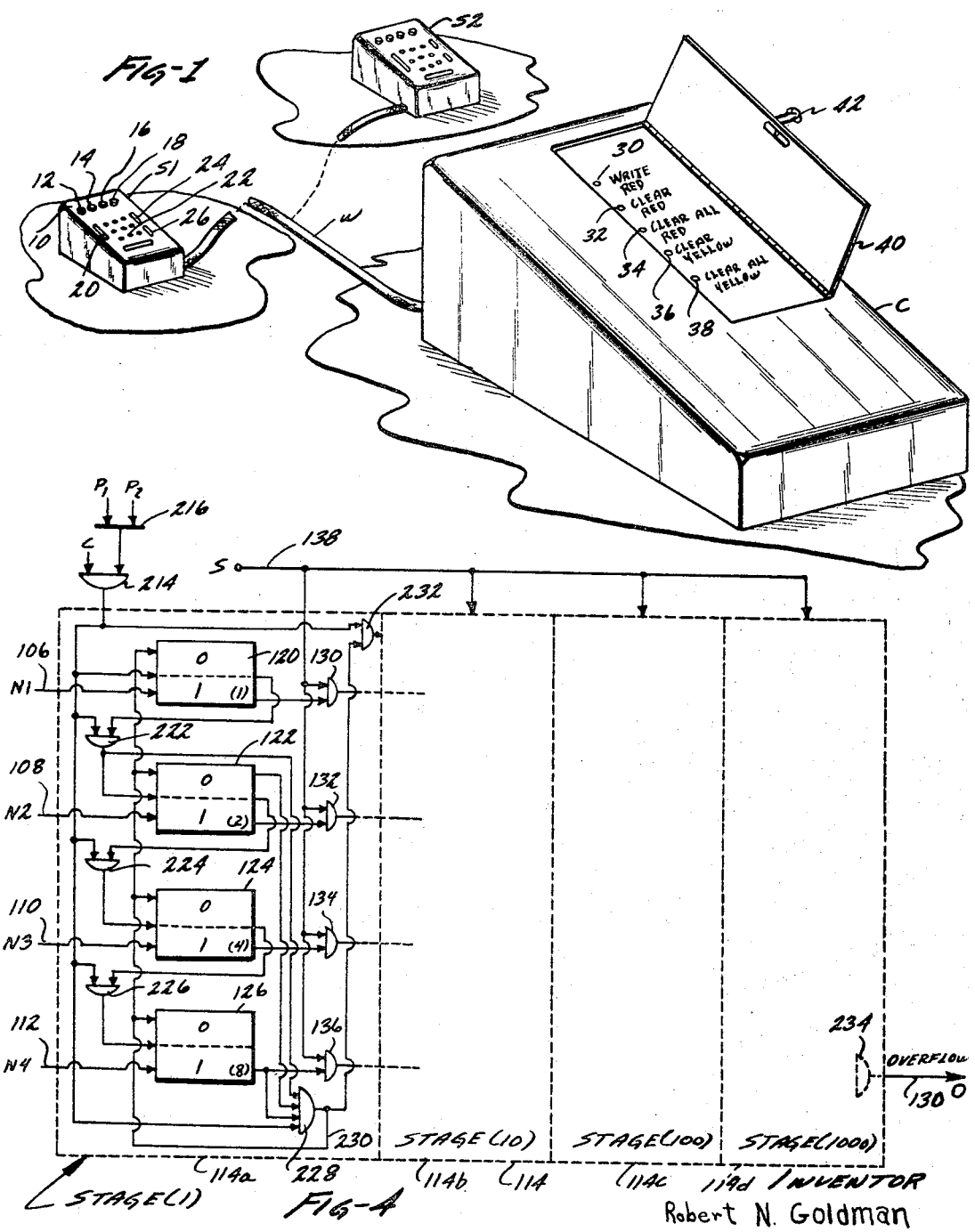

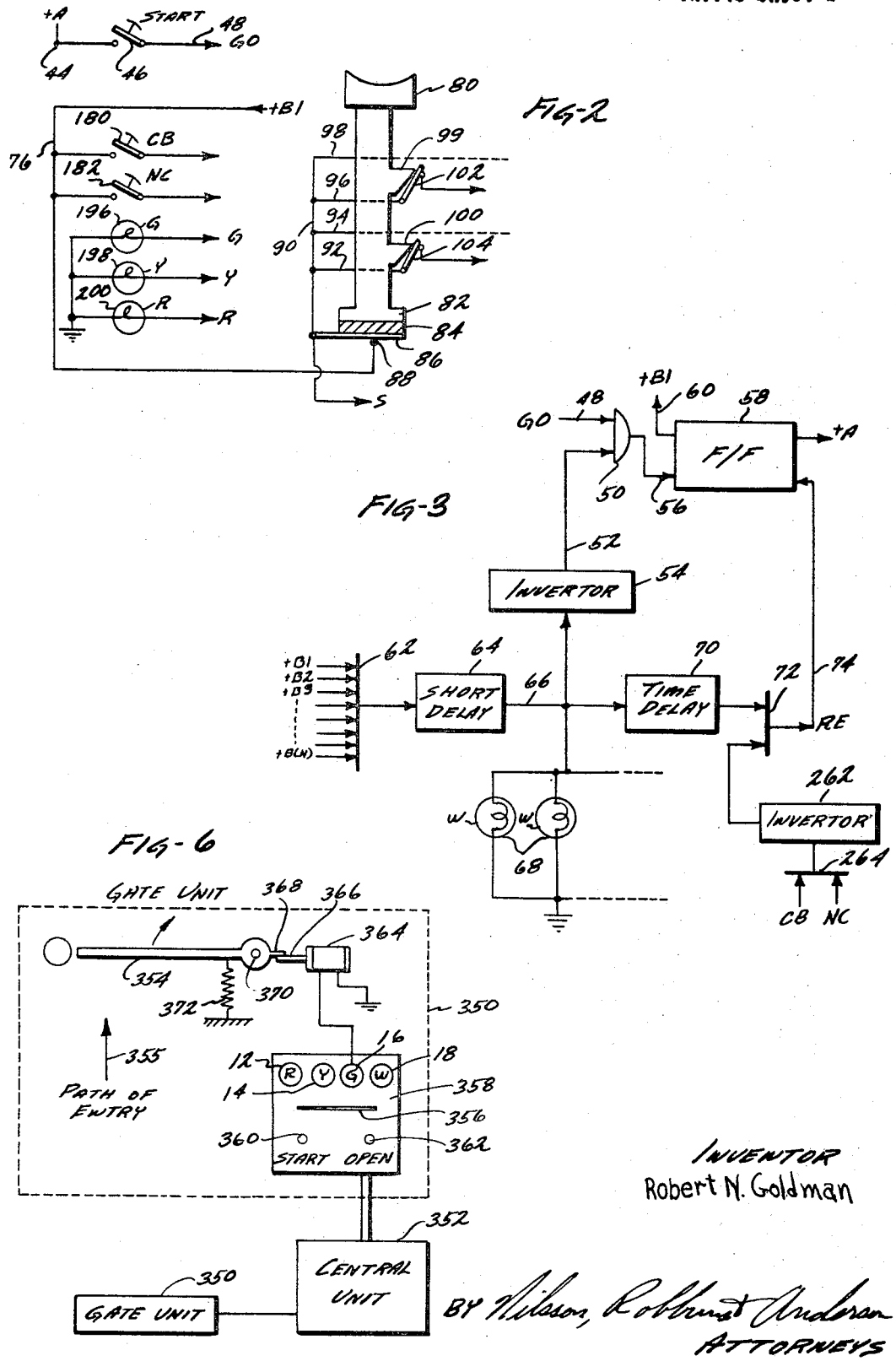

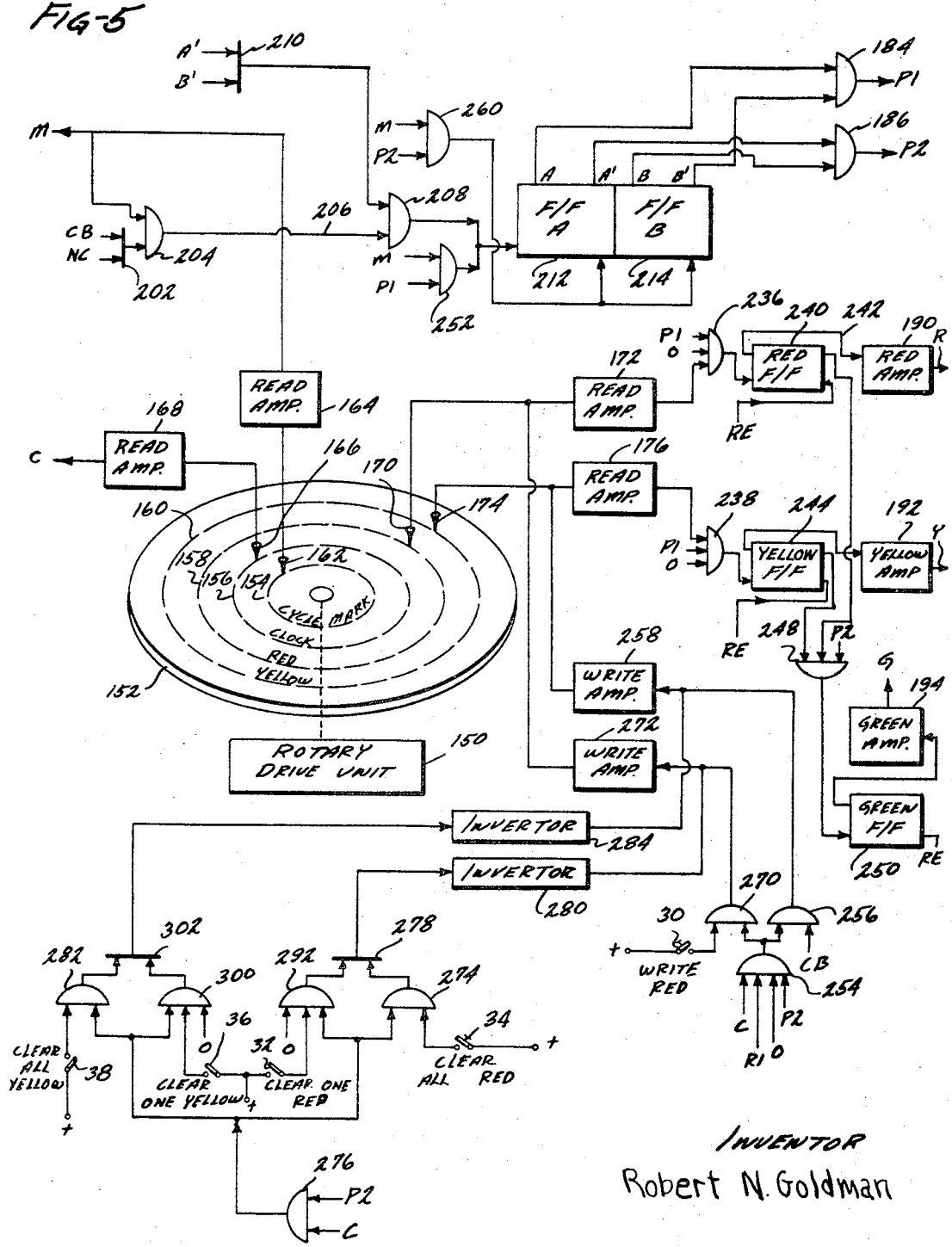

3,407,388
CUSTOMER SERVICE UNIT
Robert N. Goldman, Pacific Palisades, Calif., assignor to Telecredit, Inc., a corporation of Delaware
Filed Oct. 11, 1965, Ser. No. 494,384
11 Claims. (Cl. 340—152)

ABSTRACT OF THE DISCLOSURE

A status-indicating system is disclosed, directed specifically to provide information for regulating credit transactions and the like. An inquiry station includes structure for providing signals that identify a subject and also indicate whether or not the contemplated transaction suggests caution, e.g., cash will be returned on a check. The inquiry signals are transmitted to a primary register which has a location assigned for each subject and which locations record first signals (indicating that the subject is or is not authorized) and second signals (indicating the subject is or is not in question). The questionable status results from a relatively recent inquiry by a subject which involved a transaction of the type suggesting caution. Thus, such transactions result in the recording of the second signals, in the primary register. The system incorporates structure for selectively cancelling the first and second signals from the register, as well as for eliminating all the second signals (as at the close of a business day or other period). As disclosed, the register is a cyclic magnetic memory.

---

The present invention relates to a data-processing or information-handling system, and particularly to a system for providing a status report on subjects bearing assigned identification or designation numbers.

Commercial transactions as practiced at the present time involve the widespread use of customer credit and bank checks. Over the years, delayed payment arrangements and payment by bank check have presented a considerable problem to retail business establishments as well as various other commercial houses. That is, in view of the widespread practice of making purchases on account and the similarly widespread practice of paying for purchases by bank check, retail merchants are repeatedly faced with the alternative of accepting some form of delayed payment in return for goods sold or possibly losing a good customer.

In the past, merchants have faced the dilemma of delayed-payment sales assisted by a number of different devices and techniques. For example, some merchants have maintained card files indicating the status of their customers. Systems also have been used which photograph the customer along with his identification and the bank check if the transaction involves such a check. Furthermore, automatic data-processing systems have been employed to maintain a status record of many customers. One form of such a system is shown and described in pending United States patent application Ser. No. 102,486, Patent 3,212,062, to which the present invention is related.

Although various prior systems have been very helpful in reducing the losses incurred by merchants from credit transactions, several disadvantages remain. Specifically, for example, prior systems have often necessitated a delay period for a customer, during which the sales person consulted the manager, referred to records, or interrogated a data-processing system. Such a delay is sometimes embarrassing to the customer and annoying to other customers waiting for service. Therefore, a need exists for an improved system of manifesting a customer's status at a sales station, with essentially no delay. Furthermore, a need exists for such a system which is relatively simple, economical, and which may be embodied to provide a small, somewhat obscure unit at a retail sales station.

Various systems as considered above, for verifying an individual subjects status (before allowing a credit transaction) have sometimes incorporated a catalog of customers. For example, a card file of customers may be maintained for manual reference or credit cards may be issued to customers for presentation to indicate that the customer may cash a bank check or make purchases on credit. The maintenance of an accurate card file involves considerable effort. The practice of issuing credit cards also has disadvantages, as the difficulty of accounting for lost cards and the problem of maintaining reasonable restrictions upon the extent to which a card may be used. As indicated, these problems have been somewhat solved by prior information-handling systems: however, a need remains for a small, simple, fast system readily usable in cooperation with a list of customers in a single store, for reducing credit and bank check losses. It is also important that such a system provide the capacity for a large number of subjects, relative to the size and cost of the system.

It is therefore an object of the present invention to provide an improved system for use in cooperation with a list of customers or other subjects who may or may not carry credit cards bearing a numerical designation.

Another object of the present invention is to provide an improved system including a central apparatus for storing status information on a plurality of subjects, as customers, which unit will provide an indication of status to any of a plurality of remote units which may be conveniently located at sales stations.

Another object of the present invention is to provide an improved system for maintaining a current status file on a multiplicity of subjects, which is relatively simple and inexpensive.

Another object of the present invention is to provide an improved information system as for use in a retail establishment, to maintain and preserve a current status record on a large number of customers, which system may be effectively used to provide status information on any particular subject in a very short period of time.

Still a further object of the present invention is to provide a system for use on the premises of a commercial establishment, incorporating a central unit registering the status of a large number of customers, who may carry credit cards, which unit operates in conjunction with a plurality of remote units, situated at sales stations, each of which may interrogate the central unit to receive the current status of a customer.

These and other objects and advantages of the present invention will become apparent from a consideration of the following, taken in conjunction with the drawing, wherein:

FIGURE 1 is a perspective view of a system incorporating the present invention;

FIGURE 2 is a diagrammatic representation of a portion of the system of FIGURE 1;

FIGURE 3 is a diagrammatic representation of another portion of the system of FIGURE 1;

FIGURE 4 is a diagrammatic representation of one other portion of the system of FIGURE 1;

FIGURE 5 is a diagrammatic representation of still one other portion of the system of FIGURE 1; and FIGURE 6 is a diagrammatic representation of an alternative embodiment of the present invention.

Referring initially to FIGURE 1, there is shown a central unit C connected by a cable W to remote station units S1 and S2. The central unit C contains a cyclic register means which records the status for each of a multiplicity of subjects, e.g., store customers, and when interrogated, the central unit C provides signals indicative of status to an interrogating remote unit S1, S2 or the like, at which the status is indicated.

Considering the system in somewhat greater detail, the remote units S1 and S2 along with any reasonable number of additional similar units may be located at sales stations in a retail establishment. The central unit C may be located at a convenient concealed location to operate in cooperation with any of the remote units. As the remote units are similar, only one is here described. The top panel 10 of a remote unit mounts a plurality of lights, including a red light 12, a yellow light 14, a green light 16 and a white light 18. In the operation of the system, the energization of the white light 18 indicates the unavailability of the central unit C for interrogation.

Upon presentatation of a numerical designation from a customer, as by a credit card, the sales person pushes a start button 20 to establish communication with the central unit C. Next, the numerical designation is keyed into the system on a decimal keyboard 22. As a last step, the sales person strikes one of the buttons 24 or 26. The button 24 is pressed when the customer desires cash returned back to him from the transaction, and may therefore be identified as a CB button. The button 26 is pressed when the customer does not desire cash to be returned to him and may be called the NC button. Of course, the buttons 24 and 26 may be used in accordance with various considerations for example, the value of the merchandise involved in the transaction or the type of check being cashed. In general, the button 24 is pressed to manifest the occurrence of transactions which might suggest caution to a merchant. That is, if a customer receives substantial cash from a transaction, it may be advisable to exercise some intelligent consideration before returning more cash to him from another transaction the same day. The system may thus record cash-return transactions for manifestation upon the next interrogation. Specifically, the occurrence of a recent cash-back transaction is indicated by energization of the yellow light 14. Indication of a clear status is made by energization of the green light while a lost card or bad account number is indicated by energization of the red light.

After the sales person has operated the remote unit as described above, the central unit C senses a signal from the register addressed by the numerical designation, which signal may indicate (1) that the subject identified by the numerical designation may no longer cash checks; (2) that the subject identified has recently cashed a check and received cash in return; or (3) the subject is in good standing as a credit customer and may be given credit or his checks may be cashed. These signals are returned through the cable W to illuminate one of the colored lights 12, 14 or 16 indicative of the customer's status as indicated, e.g., green for good, red for bad, and yellow for questionable. Upon the occurrence of energization of the yellow light the sales person will normally call a supervisory person or consider other factors before accepting a check or entering a credit transaction.

In the operation of the system, the cyclic register contained in the central unit C may initially contain designations identifying only good customers approved for credit. For example, all good customers may have all been given fresh credit cards bearing numerical designations and identification. Some period after the cards are issued, some are lost and certain customers become bad credit risks. Therefore, status signals for designations identifying these customers within the central unit are changed. This change is accomplished by entering the identifying numerical designation through the keyboard 22 and the pressing of button 30 in the central unit to void a designation. In order to reactivate or clear a designation a similar technique is employed depressing a button 32 in the central unit C. To clear all unacceptable status signals, as upon the issuance of fresh credit cards, a button 34 is depressed. The buttons 36 and 38 are used to alter the "questionable" or yellow status button 36 being employed to clear a specific designation and button 38 employed to clear all "questionable" status signals.

In the normal operation of this system, all "questionable" status indications are periodically cleared depending upon the application of the system. For example, it may be dangerous for the establishment using the system as shown in FIGURE 1 to return cash on a subjects check more than once a day while there is little danger in such a transaction on a daily basis. In such an instance, the button 38 is depressed at the close of business each day to clear all indications of cash-return transactions.

The manipulation of the buttons in the central unit C by an unauthorized person could result in a substantial loss. Therefore, the buttons are covered by a door 40 fitted with a lock 42 so that the buttons are normally accessible only to authorized personnel.

In the system as shown in FIGURE 1, the units S1 and S2 may be embodied to occupy very little physical space. As a result, these units may be quite obscure at a sales station. Furthermore, the remote units S1 and S2 may be energized through the cable W so that auxiliary sources of electrical power are not required.

In using the system of FIGURE 1, a sales person may enter the subject customers numerical designation in a matter of seconds, and almost instantly receive a status indication. For example, in one satisfactory embodiment of the system, accommodating 10,000 numerical designations, and constructed substantially in accordance with the system disclosed herein, a status light is illuminated within $\frac{1}{10}$ of a second after interrogating the central unit. That is, within one tenth of a second after one of the buttons 24 or 26 is depressed one of the lights on the panel 10 is illuminated, e.g., green if the credit card is valid and has not recently been used to obtain cash from a transaction, yellow if the card is valid but has been recently used to obtain cash from a transaction or red if the card is not to be honored. Immediately after the status is manifest, the sales person withdraws his finger, deenergizing one of the signal lights as well as the white light which indicates the system is in use at each of the remote stations, as unit S1.

The remote units, are energized from the central unit C so as to accomplish exclusive coupling between a remote unit in use and the central unit C. Referring to FIGURE 2, showing a portion of one of the remote units, a conductor 44 provides potential +A from the central unit C to the remote unit. The conductor 44 is connected through a switch 46 manually operated by the start button 20 on the panel of the remote unit. Closure of the switch 46 energizes a conductor 48 at a high potential level termed the GO signal. The GO signal is returned through the conductor 48 to the central unit for application to an "and" gate 50 (FIG. 3) symbolically represented by a well known designation as used here throughout. The "and" gate 50 also receives a signal through a conductor 52 from an inverter circuit 54, the output of which is at a high level during periods when the system is not in use.

The system hereof employs two-state signals as well known in the prior art of computers and data-processing systems for controlling the states and outputs of gate circuits, flip-flop circuits and inverter circuits. Therefore, upon receipt of two high signals, the "and" gate 50 provides a high signal through a conductor 56 to change the state of a flipflop circuit 58 so that the output thereof to a conductor 60 is high. The output to the conductor 60 in a high state is termed +B1. The signal +B1 carried in the conductor 60 from the individual flipflop 58 associated with the remote unit S1 is applied to an "or" gate 62 represented by a conventional symbol used hereout, along with similar outputs from similar flipflops associated with each of the other remote units which are all located at the central unit. The signal +B1 applied to the "or" gate 62 energizes a delay circuit 64 to shortly drive a conductor 66 to a high state causing the particular remote unit that is in use to become exclusively locked to the central unit C. Specifically, the high signal in the conductor 66 upon application to the inverter circuit 54 produces a low signal in the conductor 52 thereby disabling the "and" gate 50 along with the other similar gates associated with each of the remote stations. Furthermore, the high signal in the conductor 66 energizes a plurality of lamps 68 illuminating the white lights 14 on each of the remote units to indicate that the system is in use.

In view of the possibility that a partially completed interrogation may occur at each of the remote units, the system automatically disconnects a remote unit after a predetermined time interval. Specifically the conductor 66 is connected through a time delay circuit 70 having a delay period that is relatively long compared to the interval of the delay circuit 64, e.g., ten seconds. The output of the delay circuit 70 is applied to an "or" gate 72 which upon qualification by any of a plurality of inputs provides a high signal RE in a conductor 74 serving to terminate the interconnection between a remote unit and the central unit by resetting the flipflop 58 assuming the switch 46 at a remote unit is closed.

Returning to consider the remote unit operation, and the associated flipflop 58 (FIGURE 3) produces a signal +B1 high to energize a conductor 76 in the remote unit as shown in FIGURE 2. It is to be noted, that the conductor 76 in each of the remote units remains unenergized until the start switch is closed.

After pressing the start switch to provide energy at the remote unit, the operator keys the numerical designation for a subject into the keyboard as considered above. A full decimal keyboard is provided including 10 keys; however, as various key switches are very well known in the prior art, a single representative key for the decimal digit "five" is shown in FIGURE 2. The key includes a button 80 affixed to a shank 82 the lower end of which carries a bumper 84 of insulating material. The bumper 84 is mounted for vertical movement as shown and is spring biased to an upward position by a leaf spring contact 86 which engages a fixed contact 88 when depressed (as shown). The fixed contact 88 is connected to the conductor 76 so that upon closure of the contacts 86 and 88, a circuit 90 is energized by the signal +B1 serving to provide a set of binary coded decimal signals. The circuit 90 is branched to provide a four-bit binary coded output in conductors 92, 94, 96 and 98. Of course each of the keys in the decimal keyboard of the remote unit is differently coded; however, as the key under consideration represents decimal "five," it carries a pair of extensions 99 and 100 which closes switches 102 and 104 respectively connected in series with the conductors 96 and 92. The conductor 92 represents the least-significant digit signal and higher numbered conductors represent more-significant digit signals. Thus, upon depression of the button 80, the bumper 84 moves the contact 86 into engagement with the fixed contact 88 energizing the circuit 90. At the time when these contacts were closed, the switches 102 and 104 have been closed so that the conductors 92 and 96 receive a high signal manifesting decimal "five" in accordance with conventional binary-coded decimal format. The conductors 92, 94, 96 and 98 from each of the code-forming keys on the keyboard are interconnected to provide a single four-channel output carrying signals N1, N2, N3 and N4. These signals manifest decimal numbers in binary code and are applied to conductors 106, 108, 110 and 112 (FIGURE 4) and comprise an output to a register 114 serving to address the memory system of the central unit C. The energization of the circuit 90 (FIGURE 2) also provides a signal S in a high state, which serves to shift the contents of the register 114 (FIGURE 4). That is, the register 114 includes four binary stages, e.g., a units stage 114a, a tens stage 114b, a one hundreds stage 114c, and a one thousands stage 114d. Each of the stages is similar and contains four flipflop circuits; therefore, only the units stage is shown in detail and will be described.

The individual flipflop circuits 120, 122, 124 and 126 in the units stage 114a serve to register and manifest binary components of a decimal value representative of decimal "one," "two," "four," and "eight," respectively. Specifically, the flipflop circuit 120 receives bits representative of decimal "one." The flipflop circuit 122 carries digits representative of decimal "two." The flipflop circuit 124 carries digits representative of decimal "four" and the flipflop circuit 126 carries bits representative of decimal "eight."

These flipflop circuits are interconnected to receive the binary-coded decimal values in parallel and thereafter function as counters which are incrementally advanced to eventually propagate an overflow signal out of the register on a conductor 130 indicating the register 114 has exceeded its capacity.

The flipflop circuits 120, 122, 124 and 126 are somewhat conventionally represented as a "zero" half and a "one" half. Inputs to each half on the left side of the flipflops set the units in the state indicated by the half receiving the input. Inputs at the division between the halves simply change the state. In a somewhat similar fashion, the output conductors from the flipflops present a high level of a two state signal when the associated half is set. Output conductors from the mid section between the halves provide a pulse output each time the flipflops change in state. The adoption herein of this conventional method of representing flipflops, their inputs and their outputs results in considerable simplification in the presentation of the system.

The flipflops circuits 120, 122, 124 and 126 are connected respectively to shift their contents into the tens stage 114b through "and" gates 130, 132, 134 and 136. These gates are each connected to receive a signal indicative of a registered "one" bit in each of the flipflop circuits and the shift signal S from a conductor 138. Therefore, each time a binary coded decimal digit is manifest by signals N1, N2, N3 and N4 on the four conductors 106, 108, 110 and 112 by depression of a decimal key, the signal S becomes high and the contents of each stage of the register 114 is shifted into the next higher significant stage.

After the numerical designation for a subject is contained in the register 114, that numerical value is incremented in synchronism with a cyclic memory unit as considered below, so that at the time the contents exceeds the capacity of the register 114, an overflow signal O is generated identifying a location in the cyclic memory in which the subjects status is contained.

Of course, any of a variety of memory units may be employed in accordance herewith: however, as shown in FIGURE 5, a cyclic magnetic disc memory is disclosed herein. The memory includes a rotary drive 150 coupled to drive a magnetic disc 152 as generally well known in the prior art. The disc 152 provides magnetic recording channels 154, 156, 158 and 160. The inside channel 154 communicates with a read head 162 through which a marker pulse M is provided to a read amplifier 164 once during each revolution of the disc 152. The channel 156 is filled with regularly spaced magnetic variations which are sensed by a read head 166 and provided as clock pulses C through a read amplifier 168.

The channels 158 and 160 serve to record status signals for subjects. In this regard, each numerical designation indicating a subject, say from 0000 to 9999 is provided a recording space in each of the tracks or channels 158 and 160. The presence of a recorded pulse in the space assigned a subject in the channel 158 indicates that the designated subject may no longer cash checks or make credit purchases, e.g., a "red" status. For example, the numerical designation may identify a lost credit card or a customer whose credit has become bad.

The recording track or channel 160 serves to account the recent history of customers. For example, it may be desirable in a business establishment to cash only one check per day for a customer which involves the return of cash to a customer. In using the system described herein in such an application, the recording channel 160 would be cleared at the beginning of business, then each time a subject cashed a check and received cash, an increment signal would be recorded in the location assigned his numerical designation. If a subject attempted to cash a second check and receive money from the transaction, that fact would be manifest by the system (yellow light) so that intelligent consideration could be exercised to determine whether or not the second check should be accepted.

The recording channel 158 provides pulses for the "red" signal through a recording head 170 and a read amplifier 172. The channel 160 provides pulses for a "yellow" signal through a head 174 and a read amplifier 176.

In the operation of the system, the type of transaction (cash back or not for example) is keyed into the remote unit as part of the inquiry. That is, closure of a switch 180 (FIGURE 2) provides a signal CB high indicating a "cash back" transaction. Somewhat similarly, closure of a switch NC 182 provides a signal NC high indicating "no cash" is to be returned. These signals are formed after the binary coded decimal signals N1, N2, N3 and N4 which are entered in the register 114 (FIGURE 4).

After the inquiry is registered the system enters the first phase of operation, which is manifest by the high state of a signal P1, formed from an "and" gate 184 (FIGURE 5) as will be described below. During the first phase of operation the contents of the register 114 (FIGURE 4) is incremented in synchronism with the movement of the recording disc 152 by clock pulses C to locate the assigned location for the numerical designation under inquiry. That is, as the register 114 is incremented by clock pulses C, the disc 152 revolves toward the desired location at which the register 114 will overflow to indicate the precise time at which the status signals should be sensed from the disc. In this regard, the occurrence of a "red" signal R indicating a bad numerical designation is provided from an amplifier 190 (FIGURE 5) while the occurrence of yellow signals Y and green signals G are provided respectively from amplifiers 192 and 194. These signals provide a voltage level across the appropriate lamp 196, 198 or 200 as shown in FIGURE 2 for illumination of that lamp and manifestation of either a red, a yellow or a green signal.

Thereafter, the system enters a second phase manifest by a high level of a signal P2 formed by an "and" gate 186 as described below. During the second phase of operation, the system awaits the second period of availability of the subjects storage location (one cycle of the disc 152 timed by the register 114 counting 1000 clock pulses C) then, if the transaction involved returned cash, an increment is recorded in the channel 160. The inquiry is then complete and the sequence is terminated preparatory to another inquiry.

A complete understanding of the operation of this system as disclosed herein, as well as a knowledge of the detailed structure may now best be accomplished by assuming certain exemplary operations and explaining the sequence of operation stemming thereform. Prior to proceeding in that manner; however, a table is set forth below of various signals identified herein along with the names of the signals and their source. Reference to the table may be convenient during consideration of the following description.

TABLE

| Signal | Name | Source |
| --- | --- | --- |
| C | Clock pulses 10,000/drum rev | Amplifier 168 FIG. 5. |
| M | Marker pulse 1/drum rev | Amplifier 164 FIG. 5. |
| CB | Cash-back transaction | Switch 180, FIG. 2. |
| NC | No-cash transaction | Switch 182, FIG. 2. |
| GO | Start signal | Switch 46, FIG. 2. |
| +A | Power source | FIGURE 2 |
| +B1 | Power source—active unit S1 | Flipflop 58 FIG. 3. |
| G | Green signal—Good | Amplifier 194 FIG. 5. |
| R | Red signal—bad | Amplifier 190 FIG. 5. |
| Y | Yellow signal | Amplifier 192 FIG. 5. |
| P1 | Phase 1 of operation | Gate 184 FIG. 5. |
| P2 | Phase 2 of operation | Gate 186 FIG. 5. |
| S | Shift loading pulse | Contact 86 FIG. 2. |
| O | Register Overflow | Conductor 130 FIG. 4. |
| RE | Reset signal | Gate 72 FIG. 3. |
| N1 N2 N3 N4 | Binary coded decimal signals | Circuit 90 FIG. 2. |
| A | Phase signal | Flipflop 212 FIG. 5. |
| B | do | Flipflop 214 FIG. 5. |

Negations indicated by (').

Assume a subject customer has presented a numerical designation as by a credit card or other means to a sales person. Assume further that the customer desires to cash a check involving a significant cash return to him. The sales person interrogates the system in an operation which will only take seconds, and which may be performed very simply and easily. First, the sales person consults his remote unit to determine whether or not the system is in use as signalled by the illuminated white light 18 (FIGURE 1). If the white light is energized, the system is indicated to be in use; however, the duration of the use is likely to be only a matter of seconds.

When the system is not in use, the sales person first depresses the start button 20 (FIG. 1) closing a switch 46 (FIG. 2) providing the signal GO high. The signal GO is applied to an "and" circuit 50 (FIG. 3) which, if the system is not in use as previously described, passes a signal through a conductor 56 to set a flipflop 58, thereby providing the signal +B1 in a high state and energizing the remainder of the keyboard switches.

With the signal +B1 high, the sales person depresses the appropriate decimal buttons on the keyboard 22 to set the numerical designation into binary coded decimal signals for entry into the register 114 (FIG. 4). The most significant digit is keyed initially and followed by the lesser significant decimal digits. Of course, the operation is accomplished simply by striking the appropriate decimal keys in the proper order in the keyboard 22. Considering the detail structure, the operation of the "five" key as shown in FIG. 2 will be considered. Upon depressing the button 80 of the "five" key the extensions 99 and 100 close the switches 102 and 104 connecting the first and third conductors carrying the signals N1, N2, N3, and N4 to receive the high level of signal +B1. As a result, the least significant (N1) and the third-least significant (N—3) binary digits are energized to indicate decimal "five" in accordance with well known convention.

The signals are applied to the input conductors 106, 108, 110 and 112 (FIG. 4) of the register 114. These conductors are connected to the inputs of the flipflops 120, 122, 124 and 126 in stage one of the register. Therefore, the flipflops 120 and 124 are placed in a set state, while the flipflops 122 and 126 remain reset, thereby indicating the value of decimal "five."

Upon the arrival of the next binary coded decimal digit at the register 114, the shift loading pulse S also occurs high thereby qualifying the "and" gates 130 and 134 to permit the set states of the flipflops 120 and 124 to be propagated to the ten stage 114b of the register. The third binary coded decimal digit is similarly applied in signal form and propagates the prior digits into higher-order stages of the register in a similar manner so that after four keys have been depressed, on the keyboard of the remote station, four decimal digits have been entered in the stages of the register 114.

Next, the sales person operating the inquiry station depresses the button to close switch 180 forming the signal CB high to indicate cash is to be returned from the transaction. The signal CB is applied to an "or" gate 202 (FIG. 5) along with the signal NC, the output of which is applied to an "and" gate 204 along with the marker signal M. Therefore, the "and" gate 204 is qualified at the beginning of a revolution of the magnetic disc 152, resulting in the application of a high-state signal through a conductor 206 to an "and" gate 208. The "and" gate 208 also receives a signal from an "or" gate 210 indicating the state of flipflops 212 and 214 the outputs of which are designated A and B and the negations thereof A', B' in accordance with convention. At this phase of operation, the output from the "or" gate 210 is high to qualify the "and" gate 208 which sets the flipflop 212, thereby providing the signal A high. It is to be noted, that the flipflops 212 and 214 are interconnected in the manner of a counter so that each time the flipflop 212 changes from a set state to a reset state, a pulse is supplied to the flipflop 214 to change the state thereof.

Upon the flipflop 212 becoming set, while the flipflop 214 remains reset, the "and" gate 184 is qualified to provide a high state for the signal P1 indicating the first phase of locating status signals from the magnetic disc 152. It is to be noted, that during this phase the current status of a subject is selected from a magnetic file while during the second phase (indicated by the high state of the signal P2) the status of the subject may be changed.

The high state of the signal P1 (indicating a period of scanning the magnetic memory channels) is applied to an "and" gate 214 (FIG. 4) through an "or" gate 216. As a result, the "and" gate 214 passes clock pulses C from the disc 152 which increment the numerical designation contained in the register 114. In this regard, the content of the register is incremented in stepped phase with the clock pulses C (metering the position of the disc 152) until the register 114 overflows to indicate the location of the desired status signal. It is to be noted that the location of the status signal is complemented in relation to the numerical designation or address signals. That is, if for example, the numerical designation contained in the register 114 should be 3,762, the register would overflow after receiving 6,238 clock pulses. Therefore, the location in the recording channels on the disc 152 that is addressed by the numerical designation 3,762 would be 6,238 binary spaces from the point of beginning indicated by the marker pulse M.

Considering the manner of incrementing the register 141, clock pulses are applied directly to the flipflop 120 so that each clock pulse changes the state thereof. Clock pulses are also conditionally applied to "and" gates 222, 224, and 226. The "and" gate 222 receives a pulse from the flipflop 120 each time the flipflop is reset or changed from a state registering a "one" to a state registering a "zero." In this manner, the flipflops within the stage function as a binary counter. The gates 224 and 226 similarly interconnect the higher-order flipflop stages of the counter so that the input clock pulses to the first stage of the register 114 are accumulated toward a value of decimal "nine." When the stage 114a registers "nine" the flipflop 126 and the flipflop 120 are both set while the flipflops 122 and 124 are reset. Upon the arrival of the next-following clock pulse C, the flipflop 120 is reset providing a pulse through the "and" gate 222 which is applied to an "and" gate 228. The "and" gate 228 also receives the clock pulse, a signal from the flipflop 122 (which is high when that flipflop is reset) and a signal from the flipflop 126 which is high when that flipflop is set. Therefore, the "and" gate 228 is qualified when the first stage of the register 114 advances from decimal "nine." This advancement is manifest by a pulse from "and" gate 228 which resets the flipflops 120, 122, 124 and 126 through a conductor 230 and simultaneously increments the second stage of the register 114 through an "and" gate 232 which is connected to receive clock pulses.

The gate 232 applies pulses to the second stage in the same manner as the "and" gate 214 applies pulses to the first stage. Thus, the incremental operation of the register 114 is propagated through the stages, advancing the contents of the register. Of course, similar connections exist between each of the stages so that decimal counting is propagated between the stages representative of the decimal digits.

When the fourth stage of the register 114 propagates a digit from an "and" gate 234 (coinciding to the gate 228 in the first stage) the stages of the register are all clear (registering zero) indicating that the capacity of the register has been exceeded, i.e., attained decimal "10,000." In the assumed example, of a numerical designation 3,762, the location 6,238 clock pulses from the marker pulse M has been attained.

The overflow signal O from the register 114 is therefore applied to the output circuits from the magnetic disc 152 in order to gate output signals then sensed from the disc. Specifically, the overflow signal O is applied to "and" gates 236 and 238 (FIGURE 5) which are qualified during the first phase of operation by the signal P1. These "and" gates 236 and 238 are connected to receive input signals from read amplifiers 172 and 176 respectively. If a pulse is sensed by the read amplifier 172 in the single bit position of the channel 158 from a location under observation, the numerical designation for a subject customer is indicated to be bad. Such a pulse is applied from the read amplifier 172 through the "and" gate 236 to set a flipflop 240. In accordance with the convention herein adopted, the inputs to the flipflop 240 are in the lower portion and serve to provide the flipflop in a state wherein the associated output is high. Therefore, the flipflop 240 is set to provide a high signal in a conductor 242 which is received in the amplifier 190. Upon receiving such a signal, the amplifier 190 provides an energizing signal R which is applied to the lamp 200 (FIGURE 2) to energize that lamp and manifest the recorded reject signal for the assumed numerical designation. Upon receiving such a signal, the sales person declines to accept the tendered check and may take other action in accordance with the policy of the establishment.

Assuming the numerical designation under consideration is valid, no red signal R will be developed; however, assume (to illustrate another possible operation) that the person identified by the numerical designation has received substantial cash back from a transaction just prior to the transaction presently under consideration. In such an instance, a magnetic irregularity will stand recorded in channel 160 of the disc 152 as will be explained hereafter. Therefore, the read amplifier 176 provides an output pulse which passes through the "and" gate 238, sets a flipflop 244 and therefore provides a high yellow signal Y from the amplifier 192 which energizes the yellow light 198 (FIGURE 2). As a result, the sales person is informed of the prior transaction and will take appropriate action as by calling the manager, explaining the check may not exceed the amount of purchase, or otherwise acting in accordance with the establishment's policy.

If a magnetic irregularity is not contained at the address location in either of the channels 158 or 160, the subject customer identified by the numerical designation is to be approved by energization of a green light. However, the green light is not energized until the disc 152 has been completely scanned. Specifically, at the conclusion of the first scansion over the magnetic disc 152, the system enters phase 2 as manifest by a high value for the signal P2 and return of the signal P1 to a lower level. Thereupon, an "and" gate 248 (lower right FIGURE 5) is qualified providing neither flipflops 240 nor 244 were set. As a result, a high signal is applied to a flipflop 250 which is set to provide a high level of the green signal G through the amplifier 194 to energize the green light. Upon observing such a signal, the sales person operating the system proceeds to conclude the pending transaction in accordance with the establishment's policy. It is to be emphasized, that the appearance of the light signal for observation by the sales person occurs seconds after the system is interrogated. Therefore, the verification of a subject's status is completed rapidly and without embarrassment.

Upon completion of the first scan over the magnetic disc 152, the first phase is terminated by qualification of an "and" gate 252 (upper center FIG. 5) which receives the signals M and P1 as inputs. Qualification of the "and" gate 252 (indicating the first phase manifest by a high level of the signal P1 has existed for one revolution of the disc 152) results in the application of a pulse to the flipflop 212 resetting that flipflop and setting the flipflop 214. As a result, the signals A' and B are high to qualify the gate 186 thereby setting the signal P2 at a high level. Upon this occurrence the "and" gate 184 becomes disqualified with the result that the signal P1 drops to a lower level.

During the second phase of operation, manifest by a high level of a signal P2, the system functions to record the fact that cash has been returned to a customer, providing that instruction is given to the system. In the assumed example, cash is to be returned to the customer, therefore, the signal CB is in a high state. Therefore, the customer's registration space in the channel 160 is to be found and a magnetic irregularity recorded therein.

To recapitulate, upon locating a subject customers cell in channels 158 and 160 on the disc 152, an overflow was provided from the register 114 (FIGURE 4). Afterward, the counter 114 continues to operate and will again overflow during phase 2 which is manifest by a high value of the signal P2 (qualifying the gate 254) at exactly the same location in view of the relationship between the capacity of the counter 114 and the fact that a similar binary capacity is provided by the disc 152. As a result, the overflow signal O occurs at a high value precisely at the time of the second occurrence of the customer's addressed location in the channel 160 under the head 174. The heads 170 and 174 (FIGURE 5) are both read-record heads; therefore, provision of a pulse to either of these heads accomplishes a magnetic irregularity in the associated channel which may be later sensed.

The assumed transaction involved cash return to a customer, therefore the switch was closed providing the signal CB in a high state. Therefore, at the instant when the customers location is available for a second time an "and" gate 254 (lower right FIGURE 5) is qualified by high levels of the signals P2, O, R' and C. The resulting high signal from the gate 254 is applied to an "and" gate 256 along with the signal CB manifesting cash return to the customer to provide a pulse for recording on the disc 152. That is, upon qualification of the gate 256, a pulse is supplied to the head 174 through a write or record amplifier 258 which records a binary bit in the channel 160 indicating cash has been returned to a customer identified by numerical designation.

At the conclusion of the second scanning of the magnetic disc 152 the second phase manifest by a high level of the signal P2 is terminated by an "and" gate 260 (upper center FIGURE 5). The gate 260 senses the occurrence of the marker pulse M as one input during the phase indicating signal P2 and supplies a pulse to reset both of the flipflops 212 and 214. As a result, neither phase 1 nor phase 2 is manifest and the system becomes somewhat quiescent although the light signal is still energized.

The light signal continues to be provided until the operator releases the switch he has closed indicating whether or not cash is to be returned. That is, when the operator withdraws his finger either from the switch 180 or 182 (FIG. 2) the signals CB and NC both return to a low state. As a result, an inverter 262 (lower right FIG. 3) receives a low signal from an "or" gate 264 so as to provide a high signal to the gate 72. The signal RE is formed in a high state which resets the flipflop 58 terminating the +B1 energizing signal, and similarly resets the light energizing flipflops 240, 244 and 250 as shown in FIGURE 5.

If an inquiry is initiated but not completed, the time delay circuit 70 functions, also through the gate 72 to provide the signal RE high and reset the various flipflops. Therefore, the system automatically terminates partially completed inquiries and yet enables the operator to hold the signal on long enough for clear visual observation.

It is to be noted, that the operation accomplished when no return of cash to a customer is contemplated is substantially similar to that described below. However, during phase two of the operation the signal CB remains low so that no recording may take place in the channel 160. Otherwise, the signals CB and NC are substantially similarly applied with the result that the status of a subject customer is clearly indicated by the light illuminated at the remote inquiry station.

In the use of the system described herein, it may be desirable to periodically alter a subjects status. Furthermore, upon issuing fresh credit cards or otherwise completely revising a list it will be desirable to completely clear the system. Still further, if cash return transactions are sensed on a daily basis it will be desirable to clear the channel 160 at the close of a business day. These operations are accomplished by switches 30, 32, 34, 36 and 38 on the central unit shown in FIGURE 1. Electrical representations of these switches are variously shown in FIGURE 5 and their operation will now be considered in detail.

Assume initially that it is desired to record a status indicative of a bad numerical designation as for example when a credit card is reported to be lost. Upon such an occurrence, the system is activated just as though an inquiry were being made relative the numerical designation; however, additionally, the switch 30 (lower right FIGURE 5) is also closed. As a result, in the same manner in which pulses are recorded in the cash back channel 160, pulses are recorded in the reject channel 158. Specifically, upon closure of the switch 30, an "and" gate 270 is qualified during the second phase upon occurrence of the selected numerical designation location. As a result, a pulse is supplied through the gate 270 to a write or record amplifier 272 which in turn provides the pulse for recording by the head 170. As a result, future interrogation of the storage location results in, a red signal.

The structure for clearing recorded signals from the channels 158 and 160 is generally shown in the lower left portion of FIGURE 5. To completely clear the channel 158 the switch 34 is closed qualifying an "and" gate 274 which is also connected to receive an input from an "and" gate 276 which senses clock pulses during phase two as a result of input signals P2 and C. As a result, closure of the switch 34 during an inquiry results in the application of pulses during the entire period of phase two (initiated by an inquiry directed to any numerical designation) through an "or" gate 278 to an inverter 280. Inverter 280 reverses the form of the pulses for application to the write amplifier 272 with the result that negation signals are applied to the head 170 serving to clear all recorded information in the red channel 158.

A somewhat similar operation may be performed on a daily basis by closing the clear yellow switch 38 to qualify an "and" gate 282 during phase 2 so as to provide clock pulses for inversion by an inverter 284 so as to clear the yellow channel 160 through the write amplifier 258 and the head 174.

To clear a selected bit recorded at a specified address in either the red channel 158 or yellow channel 160 switches 32 and 36 are provided. Closure of the switch 32 after initiating a conventional inquiry qualifies an "and" gate 292 during the overflow signal O at phase 2 in coincidence with the appearance of the identified storage cell under the head 170. As a result, the pulse is applied through the gate 278, the inverter 280 and the amplifier 272 to erase a recorded bit. In a very similar manner, the closure of the switch 36 during a conventional inquiry qualifies an "and" gate 300 to provide a precisely timed pulse through an "or" gate 302 and the inverter 284 so as to drive the amplifier 258 which in turn drives the head 174 to function clearing the recorded bit.

It may therefore be seen, that the system of the present invention functions to accurately account for the status of various subjects, and is capable of reporting such status a very short time after inquiry. In this regard, it is to be noted that each time a subject customer enters a transaction suggesting caution, the fact is indicated to be revealed upon future inquiries.

It is further apparent that embodiments of the present system may be manufactured to occupy a very small space to conveniently provide the desired information in a very short time. Of course, other and incidental objects of the present invention will also be apparent to those skilled in the art of data and information systems. Furthermore, many variations of this system may be provided departing widely from the structure illustratively disclosed herein.

It is also apparent that the system described herein may be adopted for use with various other basic operating principles. For example, a green light may indicate a customer has an unlimited or specified high credit balance, a yellow light indicates some question as a result, say of a recent check being cashed, and a red light might indicate a balance of some low amount, or no balance. Of course, in addition to incrementing the yellow channel for an occurrence it is readily apparent that other channels can be provided to be incremented to numerical values higher than one.

Other applications are also apparent. Specifically, for example, the system hereof could easily be adapted for use in a commercial bank to save time and embarrassment in cashing personal checks. For example, remote units, as described may be located at teller windows in one arrangement of such an application. The customers numerical designation then may simply form part of his bank number. In operating the system several alternatives are available; however, in one arrangement some dollar amount, say one hundred dollars is made significant. Each day when the accounts are processed (customarily by machine) any account having less than one hundred dollars is tagged and a pulse is recorded in the "red" channel 158 (FIGURE 5) for that customers numerical designation. Accounts of over one hundred dollars are cleared and no pulses are recorded for such customers in either of the channels 158 or 160.

In an installation of this type, upon being presented a personal check of under one hundred dollars, the window teller simply sets the customers numerical designation into a remote unit located at his side. That operation can be performed rapidly and may well escape the attention of the customer. If the customer is not tagged with a low balance and has not cashed a check that day, the green light is illuminated, as previously described, indicating a balance of over one hundred dollars. If, however, the customer had a low balance, the recorded pulse from the "red" channel 158 causes the red light to be illuminated, thereby informing the teller that further investigation must be performed.

Upon cashing a check, the teller in making an inquiry on a customer (identified by a numerical designation) automatically increments the registered value by recording a pulse at the customer's location in the "yellow" channel 160. Thereafter, if that customer subsequently presents another check during the day, the pulse from the "yellow" channel 160 recorded in his location serves to illuminate the yellow light, cautioning the teller by informing him of the prior check which may have reduced the customers balance below a safe level. The operations as described may be performed inconspicuously, with ease and results are indicated almost instantly. This application of the system therefore can provide a commercial bank considerable safety in check-cashing operations while also improving customer relations by avoiding embarrassing delays to check current balance sheets and the like.

In another exemplary application, the system hereof, is employed as a "lock" for purposes of security control as at a facility where only certain authorized persons are permitted. For example, the system hereof may be applied for use in controlling various facilities as parking lots, security plants and the like. An examplary form of the system so adapted is shown in FIGURE 6 to which reference will now be made.

Assume for example, that the system is to be used to control a parking lot for automobiles, and that identification cards are issued only to persons who are authorized to park an automobile in the lot. The cards may be provided with indentations, apertures, magnetic deposits of other means, as very well known in the prior art which can be sensed as by transducers, photo cells, switches and the like to provide digital signals indicative of numerical designations.

For use in association with the cards held by persons authorized to use the lot, there are provided one or more gate units 350 for use in connection with a central unit 352, as previously described. The gate units 350 include a blocking bar 354 which closes the gate passage indicated by an arrow 355, until the person desiring to enter is properly identified. Thereafter, the blocking bar 354 is released, so it can be pushed to an open position to permit entry.

The gate units 350 may vary in number and are each of similar structure. Identifications can be made by signals formed on a keyboard (as previously described in detail) or more ideally, by a card, or other "key" as well known in the prior art. For example, a plastic card may be inserted in a slot 356 contained in a gate box 358 which is similar to the remote units described above in detail, except that coded numerical designation signals are sensed from a card rather than to be keyed into the unit. In this regard, the gate box has a "start" button 360 similar to the "start" button 20 (previously described) and an "open" button 362 which is functionally similar to the "cash back" button 24 of the described unit. That is, the switch controlled by the button 362 is logically connected into the system just as that of the previously-described button 24.

Generally, in the operation of the system of FIGURE 6, a person wishing entry simply inserts his coded card into the slot 356, observes that the white light 18 (as previously identified) is not illuminated to indicate the system is not in use; then presses the "start" button 360 to provide the GO signal high. Next, the "open" button 362 is depressed to form a signal CB high. If the person is identified by the system detecting an authorized numerical designation, the green light 16 is energized. Furthermore, the signal applied to the green light also triggers a solenoid 364 withdrawing a latch 366 releasing an extension 368 to permit the gate blocking bar 354 to be pivotally moved about the pivot point 370. After entery, a spring 372 returns the bar 354 to a closed position.

In the operation of the system, pulses may be recorded in the red channel 158 in the locations of numerical designations for lost or rejected cards.

Presentation of such cards is then indicated upon illumination of the red light 12.

The yellow channel 160 may be cleared each morning before any persons arrive. However, as each person arrives, is identified and approved for entry, a representative pulse is recorded in the yellow channel 160. Therefore, if a duplicate card is presented, the pulse so recorded then causes the yellow light 14 to be illuminated manifesting that fact. Of course, if neither the red light 12 nor the yellow light 14 is energized, the green light 16 is energized and the gate is released.

The sysetem may thus be effectively used either attended or unattended. In the latter case, it may be desirable to place the signal lights at a location removed from the gates. Furthermore, in unattended use, it may also be desirable to combine the closure of the switches operated by the buttons 360 and 362 with the insertion of the card into the slot 356. In this recard, leaf-spring switches may be built into the slot 356 for closure upon entry of an identification card.

The system as described above has application in a number of situations for controlling several points of entry. For example, as suggested, the system would find effective application for controlling personnel entering a security plant. More specifically, the gate structure of FIGURE 6 would for example be located at each of the entry points. Persons entering would be identified as by "key" cards, identification badges with numbers, or otherwise and their numerical designations would be formed into representative signals to interrogate and increment the contents of the central unit. As described, before entry is permitted, the identifying numerical designation is checked for current validity and duplicate use. Therefore, very effective control is afforded, an inventory of persons who have entered is available, lost or otherwise invalid identification numerical designations are accounted all with relatively simple and inexpensive system.

It is readily apparent that although several examplary embodiments of the present invention have been provided, other structural embodiments will be readily apparent to those skilled in the art. Therefore, the scope hereof is not to be interpreted with relation to the disclosed, examplary embodiments, but rather in accordance with the claims set forth below.

What is claimed is:

1. A system for registering status for a multiplicity of subjects identified as by numerical designations, and for indicating a subjects status at any of a plurality of remote stations on command, comprising:

a central processing unit including a status register for registering status signals to manifest the status of each of said subjects, said status register including a first recording path and a second recording path, said first path for recording permanent status signals and said second path for recording temporary status signals;

means for sensing said status signals from said status register;

means for recording said temporary status signals in said second path upon the occurrence of designation signals addressing a designation thereon;

address register means to address said status register with designation signals, representative of a subject's designation to locate the status signals for a designated subject;

means at each of said remote stations to form designation signals representative of a subjects designation and temporary status signals for a subject;

means at each of said remote stations to manifest a subjects status under control of said status signals;

transfer means to transfer designation signals from each of said remote stations to said address register and to transfer status signals from said status register to each of said means to manifest a subjects status; and control mean for controlling said transfer means to receive designation signals from a single remote station pending return of status signals to said single remote station.

2. A system according to claim 1 wherein said status register comprises at least two circular magnetic paths and means for sensing the contents of spaces in said paths under control of said address register to provide status signals.

3. A control system for accounting status of a plurality of subjects each of which is identified as by a numerical designation, comprising:

means for forming electrical signals indicative of the numerical designation for a subject;

register means having locations for registering a first information signal indicative of unacceptable status and a second information signal indicative of a questionable status for each of said numerical designations;

means for transmitting said electrical signals indicative of a numerical designation to said register means;

means for providing information signals from said register means from a location therein identified by received electrical signals indicative of a numerical designation;

means for manifesting said information signals; and means for recording a second information signal in a location identified by a numerical designation upon the provision of said information signals by said means for providing information signals.

4. A system for providing a status report on subjects identified by numerical designations pursuant to various transactions comprising:

means for forming electrical inquiry signals indicative of the numerical designations for a subject;

means for forming electrical inquiry signals indicative of a transaction suggesting caution;

status register means having locations for registering first status signals and second status signals for said numerical designations;

means for transmitting said electrical inquiry signals to said register means;

means for providing status signals from one location in said status register identified by said received electrical inquiry signals indicative of the numerical designation for a subject;

means for manifesting said status signals from said status register in response to said inquiry signals; and means for recording said electrical inquiry signals indicative of a transaction suggesting caution, as second status signals in said one location identified by said received electrical inquiry signals indicative of the numerical designation for a subject.

5. A system according to claim 4 wherein said means for manifesting said status signals comprise:

a first lamp for indicating approval; a second lamp for indicating disapproval and controlled by said first status signals; and a third lamp indicating caution, and controlled by said second status signals.

6. A system according to claim 4 further including means for selectively clearing all of said second status signals recorded in said status register.

7. A system according to claim 4 wherein said register means comprises a plurality of circular recording paths and wherein said means for providing status signals from one location in said status register includes means to scan said recording paths during a first cycle, and said means for recording said second status signals includes means to scan said recording paths during a second cycle.

8. A system according to claim 7 wherein said circular recording paths comprise paths of magnetic recording medium.

9. A system according to claim 8 further including means for selectively clearing all of said second status signals recorded in said status register.

10. A system according to claim 9 wherein said means for manifesting said status signals comprise: a first lamp for indicating approval; a second lamp for indicating disapproval and controlled by said first status signals; and a third lamp indicating caution, and controlled by said second status signals.

11. A system according to claim 4 further including means for selectively clearing said second status signals from select locations of said status register.

References Cited
UNITED STATES PATENTS

| | | | |
|---|---|---|---|
| 2,674,728 | 4/1954 | Potter | 340—174 |
| 3,184,714 | 5/1965 | Brown et al. | 235—61.7 X |
| 3,344,258 | 9/1967 | Michels | 235—61.7 |

EUGENE G. BOTZ, *Primary Examiner.*